United States Patent
Jang et al.

(10) Patent No.: US 11,069,140 B2
(45) Date of Patent: Jul. 20, 2021

(54) DISPLAY PANEL, DISPLAY DEVICE, AND VIRTUAL REALITY/AUGMENTED REALITY DEVICE

(71) Applicant: LG DISPLAY CO., LTD., Seoul (KR)

(72) Inventors: HyunWoo Jang, Gyeonggi-do (KR); Kyungjin Jang, Seoul (KR)

(73) Assignee: LG DISPLAY CO., LTD, Seoul (KR)

( * ) Notice: Subject to any disclaimer, the term of this patent is extended or adjusted under 35 U.S.C. 154(b) by 0 days.

(21) Appl. No.: 16/424,764

(22) Filed: May 29, 2019

(65) Prior Publication Data
US 2019/0371070 A1 Dec. 5, 2019

(30) Foreign Application Priority Data
May 30, 2018 (KR) .................. 10-2018-0061714

(51) Int. Cl.
*G06T 19/00* (2011.01)
*G09G 3/20* (2006.01)
*G02B 27/01* (2006.01)

(52) U.S. Cl.
CPC .......... *G06T 19/006* (2013.01); *G02B 27/017* (2013.01); *G09G 3/20* (2013.01)

(58) Field of Classification Search
CPC .. G06T 19/006; H04N 9/3185; G02B 27/017; G09G 3/20
See application file for complete search history.

(56) References Cited

U.S. PATENT DOCUMENTS

| | | | |
|---|---|---|---|
| 5,758,941 A | 6/1998 | Stahl | |
| 9,843,689 B1* | 12/2017 | Heller | H04N 1/00267 |
| 2006/0093213 A1* | 5/2006 | Steinberg | G06T 5/005 382/167 |
| 2010/0026899 A1* | 2/2010 | Aragaki | H04N 9/3194 348/607 |
| 2013/0083298 A1* | 4/2013 | Yoshimura | H04N 9/3194 353/69 |
| 2015/0179147 A1* | 6/2015 | Rezaiifar | G06F 1/1694 345/625 |
| 2015/0215495 A1* | 7/2015 | Komiyama | H04N 5/08 348/477 |

(Continued)

FOREIGN PATENT DOCUMENTS

| | | |
|---|---|---|
| CN | 1628468 A | 6/2005 |
| CN | 1663289 A | 8/2005 |

(Continued)

OTHER PUBLICATIONS

Chinese Office Action dated Mar. 19, 2021 issued in Patent Application No. 201910457502.X w/English Translation (20 pages).

*Primary Examiner* — Jeffery A Brier
(74) *Attorney, Agent, or Firm* — Polsinelli PC

(57) ABSTRACT

A display device includes a display panel in which a plurality of subpixels are disposed and the display panel comprises a first active area in which N number of subpixels among the plurality of subpixels are disposed, and a second active area in which M number of subpixels among the plurality of subpixels are disposed and is located outside of the first active area, and a first image and a second image are displayed on the subpixels disposed in the first active area, and the first image and a blank image are displayed on the subpixels disposed in the second active area.

16 Claims, 19 Drawing Sheets

(56) References Cited

U.S. PATENT DOCUMENTS

2016/0270656 A1* 9/2016 Samec .................... A61B 3/12
2016/0328882 A1* 11/2016 Lee ..................... H04N 13/366
2017/0316607 A1* 11/2017 Khalid ................... G06F 3/147
2019/0156466 A1* 5/2019 Cho ....................... G06T 5/006

FOREIGN PATENT DOCUMENTS

| CN | 104185807 A | 12/2014 | |
|---|---|---|---|
| CN | 104516699 A | 4/2015 | |
| CN | 105739099 A | 7/2016 | |
| CN | 106094200 A | 11/2016 | |
| CN | 107003512 A | 8/2017 | |
| EP | 2979736 A2 | 2/2016 | |
| JP | 61150487 A | * 7/1986 | ........... H04N 9/3105 |

* cited by examiner

FIG. 4

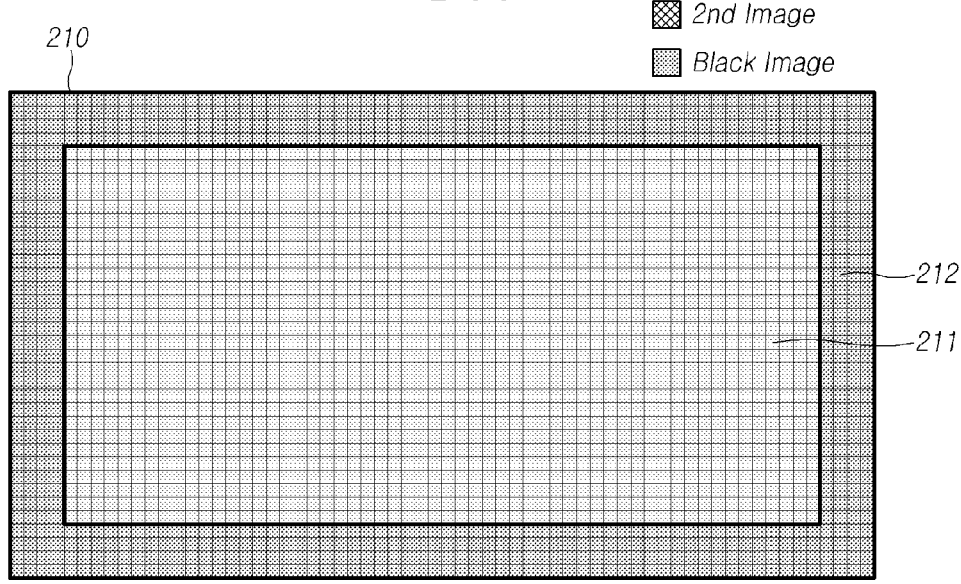
FIG.7
☐ 1st Image
▨ 2nd Image
▧ Black Image
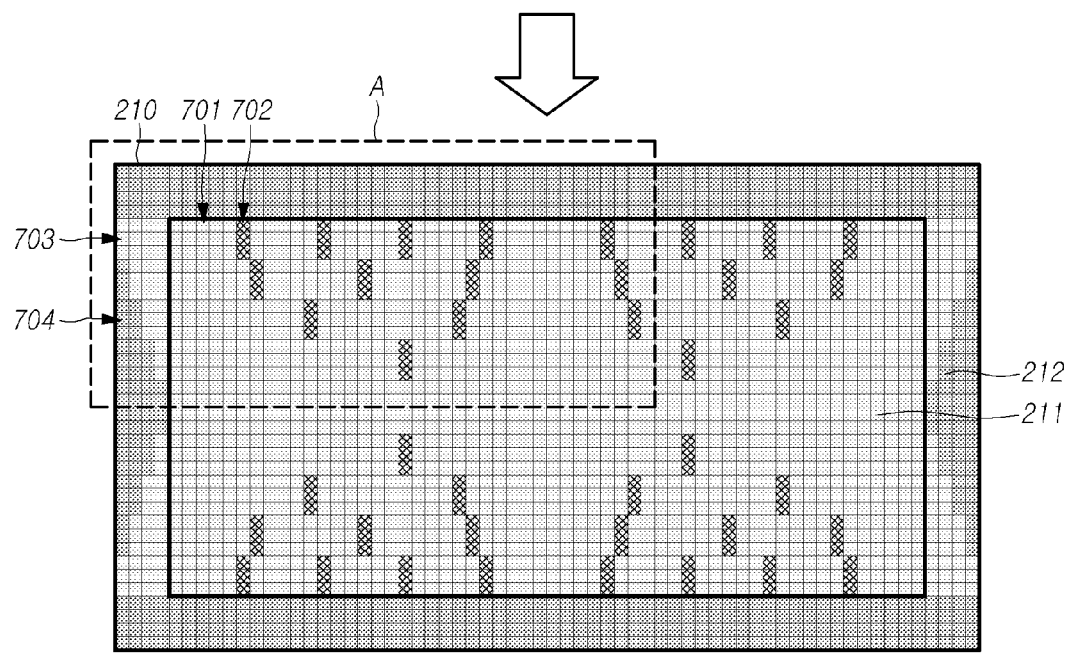

DISPLAY PANEL, DISPLAY DEVICE, AND VIRTUAL REALITY/AUGMENTED REALITY DEVICE

CROSS REFERENCE TO RELATED APPLICATION

This application claims priority to Korean Patent Application No. 10-2018-0061714, filed on May 30, 2018, which is hereby incorporated by reference in its entirety for all purposes as if fully set forth herein.

BACKGROUND

Field of the Disclosure

The present disclosure relates to a display apparatus, and more particularly, to a display panel, a display device and a virtual reality/augmented reality device.

Description of the Background

In response to the development of the information society, demand for display devices for displaying images is increasing. In this regard, a range of display devices, such as liquid crystal display (LCD) devices, plasma display devices, and organic light-emitting diode (OLED) display devices, have recently come into widespread use.

Such display devices have recently been used in virtual reality/augmented reality devices allowing users to experience virtual reality using virtual images or providing users with augmented reality using images in which virtual objects are mixed with real world environments.

Such a virtual reality/augmented reality device may include a display device displaying images and an optical device transferring images, emitted by the display device, to a user.

In the virtual reality/augmented reality device, the optical device may be shifted from an aligned position or components of the optical device may be deformed. Due to such states of the optical device, an image emitted by the display device may be transferred to the user in a distorted manner, which is problematic.

The optical device of the virtual reality/augmented reality device may include components, such as a light guide plate, a reflector, and a lens. Since image distortion may be caused by one or more components, it may be difficult to find which components have caused the image distortion.

In addition, even in the case in which the optical components that have caused the image distortion, it is difficult to correct a distorted image by adjusting the optical device because the virtual reality/augmented reality device is generally provided in a miniaturized form.

SUMMARY

Accordingly, the present disclosure is directed to a display panel, a display device and a virtual reality/augmented reality device that substantially obviate one or more of problems due to limitations and disadvantages of the prior art.

Additional features and advantages of the disclosure will be set forth in the description which follows and in part will be apparent from the description, or may be learned by practice of the invention. Other advantages of the present disclosure will be realized and attained by the structure particularly pointed out in the written description and claims hereof as well as the appended drawings.

The present disclosure is to provide a display panel, a display device, and a virtual reality/augmented reality device having a structure able to easily correct distortion of an image, caused by an optical device, in the virtual reality/augmented reality device.

Also, the present disclosure is to provide a display panel, a display device, and a virtual reality/augmented reality device having a structure able to correct both non-linear distortion and linear distortion in the virtual reality/augmented reality device.

Also, the present disclosure is to provide a display panel, a display device, and a virtual reality/augmented reality device having a structure able to correct a distorted image while maintaining the resolution of the image emitted by the display device when correcting the distorted image in the virtual reality/augmented reality device.

According to an aspect of the present disclosure, a virtual reality/augmented reality device may include a display device displaying an image; and an optical device transferring the image displayed by the display device.

In the virtual reality/augmented reality device, the display device may include: a display panel in which a plurality of gate lines, a plurality of data lines, and a plurality of subpixels are disposed; a gate driver circuit driving the plurality of gate lines; a data driver circuit driving the plurality of data lines; and a controller controlling the gate driver circuit and the data driver circuit.

In addition, the display panel may include a first active area in which N number of subpixels among the plurality of subpixels are disposed and a second active area in which M number of subpixels among the plurality of subpixels are disposed, the second active area being located outside of the first active area, where the N is a natural number equal to or greater than 2, and the M is a natural number equal to or greater than 2. The image may be displayed on the N number of subpixels or more subpixels among the plurality of subpixels in the first active area and the second active area, and a blank (or black) image may be displayed on subpixels among the plurality of subpixels, except for the subpixels displaying the image.

According to another aspect of the present disclosure, a display device may include: a display panel in which a plurality of gate lines, a plurality of data lines, and a plurality of subpixels are disposed; a gate driver circuit driving the plurality of gate lines; a data driver circuit driving the plurality of data lines; and a controller controlling the gate driver circuit and the data driver circuit. The display panel may include a first active area in which N number of subpixels among the plurality of subpixels are disposed and a second active area in which M number of subpixels among the plurality of subpixels are disposed, the second active area being located outside of the first active area, where the N is a natural number equal to or greater than 2, and the M is a natural number equal to or greater than 2. A first image and a second image may be displayed on the subpixels disposed in the first active area, and the first image and a blank (or black) image may be displayed on the subpixels disposed in the second active area.

According to another aspect of the present disclosure, a display panel may include: a first active area in which N number of subpixels are disposed; and a second active area in which M number of subpixels are disposed, the second active area being located outside of the first active area, where the N is a natural number equal to or greater than 2, and the M is a natural number equal to or greater than 2. A first image and a second image may be displayed on the subpixels disposed in the first active area, and the first image and a blank (or black) image may be displayed on the subpixels disposed in the second active area.

According to exemplary aspects, it is possible to correct distortion in an image, caused by the optical device, by dividing the area of the display panel into a first active area and a second active area and displaying the image in at least one portion of the second active area, so that the display device can output the corrected image.

In addition, according to exemplary aspects, it is possible to correct both non-linear distortion and linear distortion in an image by displaying the image differently in the second active area of the display panel, depending on the type of distortion of the image.

Furthermore, according to exemplary aspects, it is possible to correct a distorted image while maintaining the resolution of an original image by correcting the distorted image by displaying the image in the second active area of the display panel.

BRIEF DESCRIPTION OF THE DRAWINGS

The above and other objects, features, and advantages of the present disclosure will be more clearly understood from the following detailed description when taken in conjunction with the accompanying drawings, in which:

FIG. 4 is a diagram illustrating methods of correcting a distorted image in the virtual reality/augmented reality device according to exemplary aspects;

FIG. 7 is a diagram illustrating images displayed by the display panel according to exemplary aspects in order to correct non-linear distortion;

DETAILED DESCRIPTION

Figure 1A:
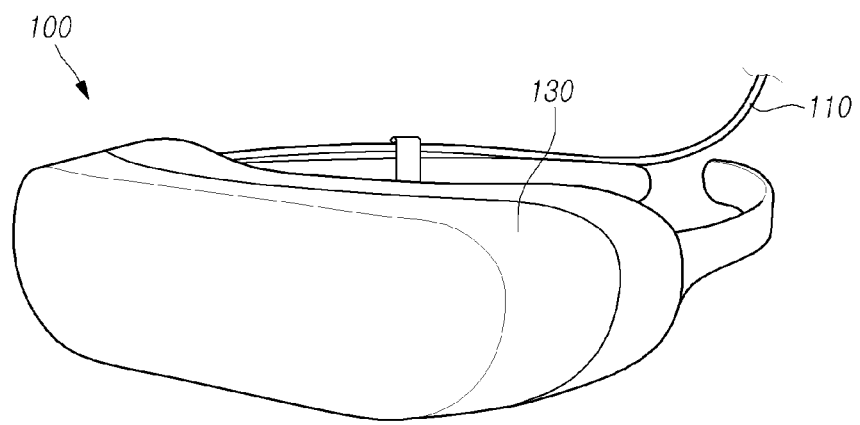
FIGS. 1A and 1B are front and rear perspective views illustrating a schematic structure of a virtual reality/augmented reality device according to exemplary aspects.

Hereinafter, reference will be made to aspects of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated into the present disclosure will be omitted in the case that the subject matter of the present disclosure may be rendered unclear thereby.

It will also be understood that, while terms, such as "first," "second," "A," "B," "(a)," and "(b)," may be used herein to describe various elements, such terms are merely used to distinguish one element from other elements. The substance, sequence, order, or number of such elements is not limited by these terms. It will be understood that when an element is referred to as being "connected," "coupled," or "linked" to another element, not only can it be "directly connected, coupled, or linked" to the other element, but it can also be "indirectly connected, coupled, or linked" to the other element via an "intervening" element.

Figure 1B:
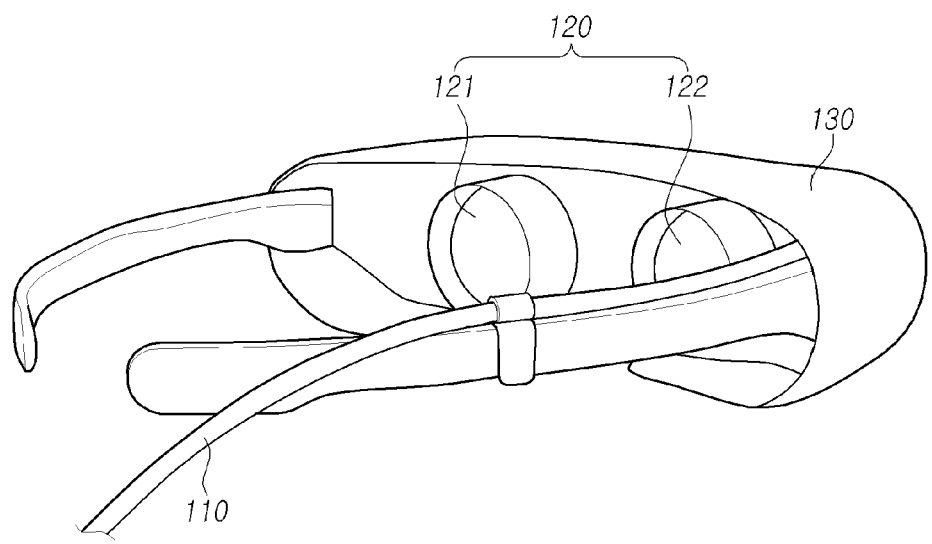

FIGS. 1A and 1B are front and rear perspective views illustrating a schematic structure of a virtual reality/augmented reality device according to exemplary aspects, a headset device displaying virtual reality or augmented reality images.

Referring to FIGS. 1A and 1B, the virtual reality/augmented reality device 100 according to exemplary aspects may include an image signal input line 110, through which image signals are input, displays 120 displaying an image based on image signals, and a housing 130 accommodating the image signal input line 110, the displays 120, and the like.

The image signal input line 110 transfers image data, transmitted from an external source (e.g. a terminal, a server, or the like), to the displays 120. In addition, the image signal input line 110 may transfer control signals, transmitted from an external source, to the displays 120.

When the virtual reality/augmented reality device 100 receives image data or control signals via wireless communications, the virtual reality/augmented reality device 100 may not include the image signal input line 110. That is, the virtual reality/augmented reality device 100 may include a wireless communications module, and receive image data and control signals via the wireless communications module before transferring image data and control signals.

The displays 120 display an image corresponding to image data received from an external source. The virtual reality/augmented reality device 100 may include two displays 120 as illustrated in FIG. 1B, although only a single display 120 may be provided.

For example, as illustrated in FIG. 1B, the virtual reality/augmented reality device 100 may include a first display 121 providing a left-eye image to a user and a second display 122 providing a right-eye image to the user.

Due to the first display 121 and the second display 122 providing the left-eye image and the right-eye image, a virtual reality image or an augmented reality image can be provided to the user. Each of the first display 121 and the second display 122 may include a configuration displaying an image and a configuration transferring the displayed image to the user.

Figure 2:
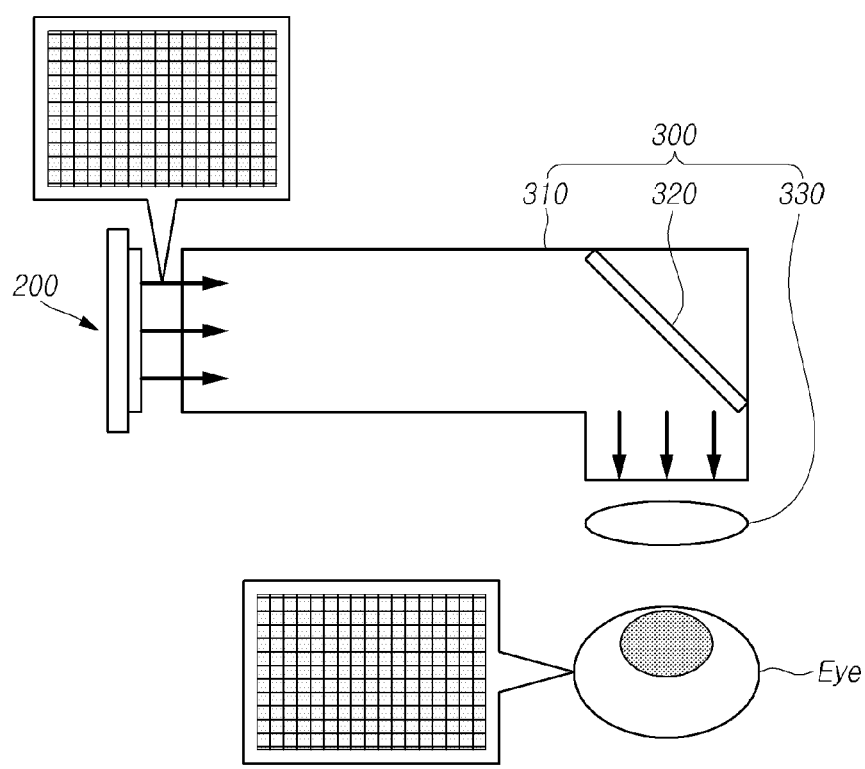
FIG. 2 is a diagram illustrating a schematic structure of the display in the virtual reality/augmented reality device according to exemplary aspects.

FIG. 2 is a diagram illustrating a display device 200 and an optical device 300 of the display 120 in the virtual reality/augmented reality device 100 according to exemplary aspects.

Referring to FIG. 2, the display 120 of the virtual reality/augmented reality device 100 according to exemplary aspects may include the display device 200 displaying an image corresponding to image data received from an external source and the optical device 300 transferring the image, displayed by the display device 200, to the user.

Here, the display device 200 may be a typical display device 200 displaying the image by receiving image data and adjusting brightness levels of subpixels, based on the image data. That is, the display device 200 may be provided in a miniaturized form of a liquid crystal display (LCD) device or an organic light-emitting display device.

Alternatively, the display device 200 may be a micro display device realized by embodying subpixels, signal lines, or the like, on a silicon substrate by semiconductor processing. Such a micro display device may include subpixels respectively including a light-emitting device, such as a light-emitting diode (LED) or an organic light-emitting diode (OLED).

In some cases, each of the subpixels of the micro display device may be provided as a single display device 200. That is, the micro display device may be configured such that a light-emitting device and a variety of driver circuits for driving the light-emitting device are disposed in each of the subpixels.

The image, displayed by the display device 200, may be transferred to the user via the optical device 300 including a variety of optical components.

The optical device 300 may include, for example, a light guide 310, a reflector 320, an optical lens 330, and the like.

The light guide 310 is a member allowing the image, displayed by the display device 200, to be transferred to the user. The light guide 310 may be configured such that the light guide 310 connects a position in which the image is displayed by the display device 200 and a position in which an eye of the user is located.

The image, transferred by the light guide 310, may be reflected by the reflector 320 and then be guided by the optical lens 330 to arrive at the eye of the user.

Accordingly, in the virtual reality/augmented reality device 100, the image, emitted by the display device 200, may be transferred to the user via the optical device 300. The image arriving at the eye must be the same as the image emitted by the display device 200, as illustrated in FIG. 2.

Here, the orientations of the optical components of the optical device 300 may be distorted or the optical components may have variations therebetween, such that the image transferred to the eye may be distorted depending on the state of the optical components.

Figure 3:
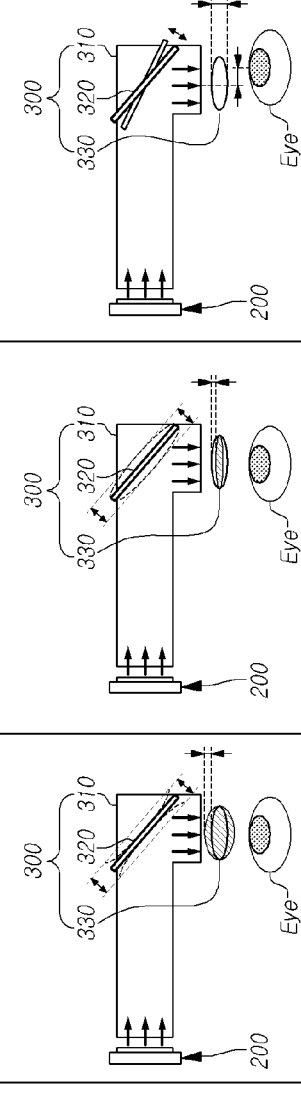
FIG. 3 is a diagram illustrating an image arriving at eyes of a user, depending on the state of the optical device.

FIG. 3 is a diagram illustrating examples of an image arriving at an eye of a user, depending on the state of the optical device 300, in the virtual reality/augmented reality device 100 according to exemplary aspects.

Referring to FIG. 3, in the virtual reality/augmented reality device 100 according to exemplary aspects, the optical device 300 may have problems, such as warpage in the reflector 320, distance deviation between the optical lens 330 and the light guide 310, and thickness variation in the optical lens 330. In addition, the position of the eye of the user may be located in a position shifted from the center of the optical lens 330, depending on the user.

For example, referring to Case A in FIG. 3, if peripheral portions of the reflector 320 of the optical device 300 are warped or the thickness of the optical lens 330 of the optical device 300 is thicker than a predetermined thickness (due to shift of the lens, thermal expansion of the lens, or the like), the image, emitted by the display device 200, may have a centrally-convex shape when arriving at the eye of the user (i.e., Barrel Distortion).

In addition, referring to Case B in FIG. 3, if a central portion of the reflector 320 is warped or the thickness of the optical lens 330 of the optical device 300 is thinner than a predetermined thickness, the image, emitted by the display device 200, may have a centrally-concave shape when arriving at the eye of the user (i.e., Pincushion Distortion).

Such barrel distortion and pincushion distortion occurring in the image are referred to as "non-linear distortion."

In addition, referring to Case C in FIG. 3, if the reflector 320 is disposed to be tilted from the original position or the position of the eye of the user is not fixed, the entirety or a portion of the image, emitted by the display device 200, may be shifted when arriving at the eye of the user (i.e., Shift Distortion).

Such shift distortion occurring in the image is also referred to as "linear distortion."

Such non-linear/linear distortion of the image may be removed by adjusting the arrangement of the optical device 300 or replacing the components of the optical device 300.

However, it is difficult to correct the distortion of the image by adjusting the optical device 300, since it is difficult to accurately specify a component causing such distortion of the image, and the virtual reality/augmented reality device 100 is generally provided in miniaturized form.

In the virtual reality/augmented reality device 100 according to exemplary aspects, the display device 200 may display an image, any distortion of which is correctable before the image arrives at the eye of the user, so that the image can be displayed without distortion, regardless of the state of the optical device 300.

Figure 4:
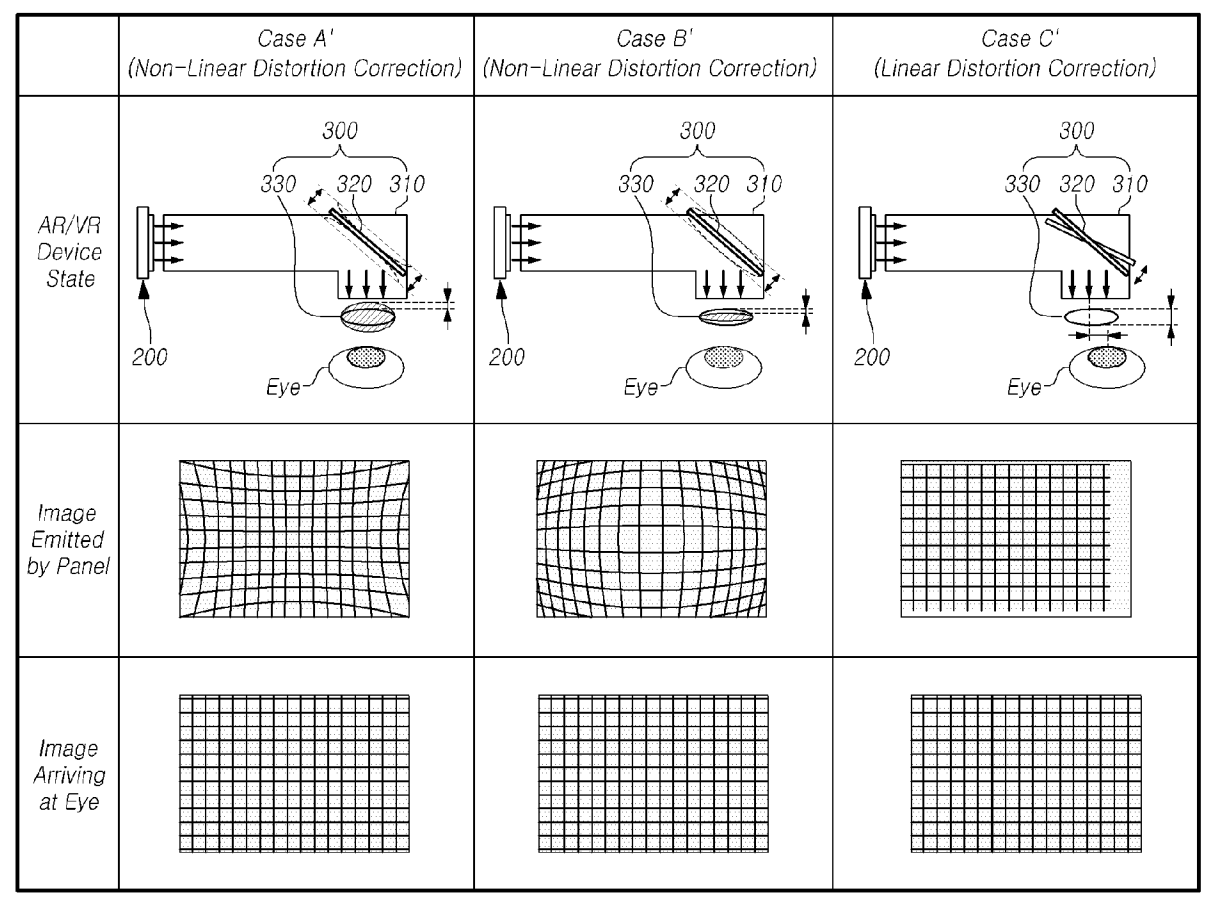

FIG. 4 is a diagram illustrating methods in which the virtual reality/augmented reality device 100 according to exemplary aspects corrects an image displayed by the display device 200, so that the image arrives at the eye of the user without distortion.

Referring to FIG. 4, when barrel distortion occurs as in Case A of FIG. 3, an image emitted by the display device 200 is displayed such that the image having a centrally-concave shape passes through the optical device 300. Specifically, if the display device 200 displays the image having the centrally-concave shape, the central portion of the image is convexed while passing through the optical device 300, so that the image arrives at the eye of the user without distortion (Case A').

In another example, when pincushion distortion occurs as in Case B of FIG. 3, the display device 200 outputs an image such that the image having centrally-convex shape passes through optical device 300. The central portion of the image is concaved while passing through the optical device 300, so that that the image arrives at the eye of the user without distortion (Case B').

In another example, when shift distortion occurs as in Case C of FIG. 3, the display device 200 displays an image, the entirety or a portion of which is shifted in a certain direction. While the image is passing through the optical device 300, the image may be shifted in the opposite direction from the direction in which the image, emitted by the display device 200, is shifted, so that that the image without linear distortion may arrive at the eye of the user (Case C').

Such correction of the distorted image may be performed when the user of the virtual reality/augmented reality device 100 manipulates a distortion correction button or adjusts settings in an environment setting screen of the device, based on the image arriving at the eye of the user.

As described above, the virtual reality/augmented reality device 100 according to exemplary aspects and the display device 200 of the same may display an image by correcting the distortion of the image, so that the image may arrive at the eye without distortion via the optical device 300.

In addition, the display device 200 according to exemplary aspects may display an image by dividing an image display area into a base area and a distortion correction area (i.e. an area for the correction of distortion), so that non-linear/linear distortion can be accurately corrected, and the distortion of the image can be corrected, with the resolution of the original image being maintained.

Hereinafter, specific methods of correcting the distortion of an image will be described, focused on the structure of the display device 200 of the virtual reality/augmented reality device 100 according to exemplary aspects, as well as image display techniques.

Figure 5:
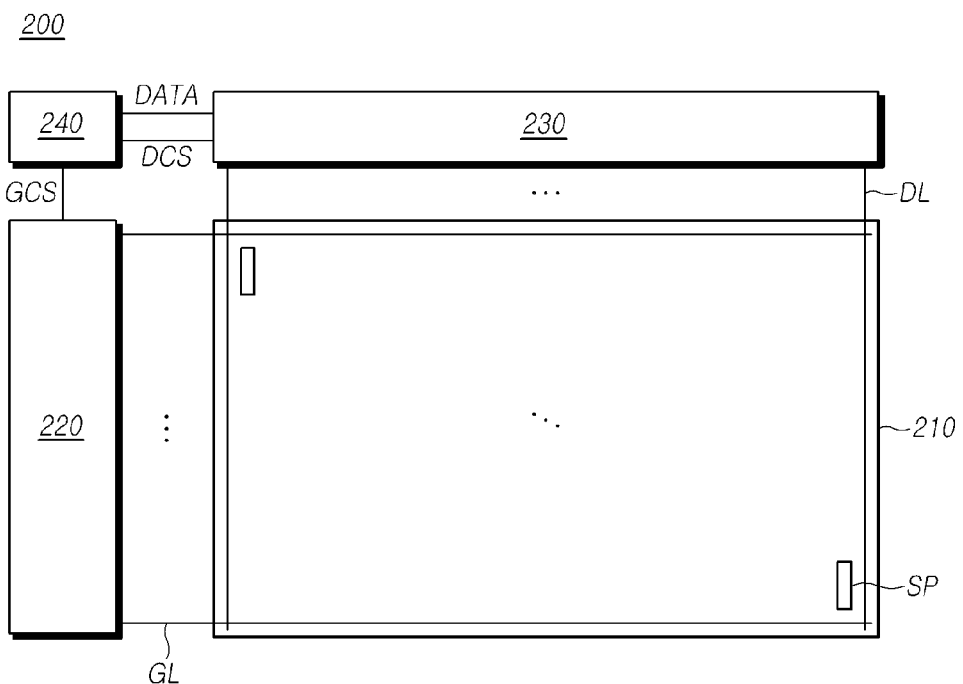
FIG. 5 is a diagram illustrating a schematic configuration of the display device of the virtual reality/augmented reality device according to exemplary aspects.

FIG. 5 is a diagram illustrating a schematic configuration of the display device 200 of the virtual reality/augmented reality device 100 according to exemplary aspects.

As described above, the display device 200 may be provided in miniaturized form of an existing display device or may be a micro display device realized on a silicon substrate by semiconductor processing. In addition, each of subpixels SP may be realized as a single display device 200.

Describing basic components of the display device 200 with reference to FIG. 5, the display device 200 according to exemplary aspects may include a display panel 210 in which a plurality of subpixels SP are arrayed and components for driving the display panel 210, such as a gate driver circuit 220, a data driver circuit 230, and a controller 240.

In the display panel 210, a plurality of gate lines GL and a plurality of data lines DL are disposed, and the plurality of subpixels SP are disposed in areas in which the plurality of gate lines GL intersect the plurality of data lines DL.

The gate driver circuit 220 is controlled by the controller 240 to sequentially output a scan signal to the plurality of gate lines GL, disposed in the display panel 210, thereby controlling points in time at which the plurality of subpixels SP are driven.

The gate driver circuit 220 may include one or more gate driver integrated circuits (GDICs). The gate driver circuit 220 may be disposed on one side or both sides of the display panel 210, depending on the driving system. Alternatively, the gate driver circuit 220 may have a gate-in-panel structure embedded in a bezel area of the display panel 210.

The data driver circuit 230 receives image data from the controller 240 and converts the image data into analog data voltages. In addition, the data driver circuit 230 outputs the data voltages to the data lines DL, respectively, at points in time at which the scan signal is applied through the gate lines GL, so that the subpixels SP represent brightness levels corresponding to the image data.

The data driver circuit 230 may include one or more source driver integrated circuits (SDICs).

The controller 240 supplies a variety of control signals to the gate driver circuit 220 and the data driver circuit 230 to control the operations of the gate driver circuit 220 and the data driver circuit 230.

The controller 240 controls the gate driver circuit 220 to output the scan signal at points in time defined by frames. The controller 240 converts image data, received from an external source, into a data signal format readable by the data driver circuit 230, and outputs the converted image data to the data driver circuit 230.

The controller 240 receives a variety of timing signals, including a vertical synchronization signal Vsync, a horizontal synchronization signal Hsync, an input data enable signal DE, a clock signal CLK, and the like, in addition to the image data, from an external source (e.g. a host system).

The controller 240 may generate a variety of control signals using the variety of timing signals received from the external source and output the control signals to the gate driver circuit 220 and the data driver circuit 230.

For example, the controller 240 outputs a variety of gate control signals, including a gate start pulse GSP, a gate shift clock GSC, a gate output enable signal GOE, and the like, to control the gate driver circuit 220.

Here, the gate start pulse GSP controls the operation start time of the one or more GDICs of the gate circuit 220. The gate shift clock GSC is a clock signal commonly input to the one or more GDICs to control the shift time of the scan signal. The gate output enable signal GOE designates timing information of the one or more GDICs.

In addition, the controller 240 outputs a variety of data control signals, including a source start pulse SSP, a source sampling clock SSC, a source output enable signal SOE, and the like, to control the data driver circuit 230.

Here, the source start pulse SSP controls the data sampling start time of the one or more SDICs of the data driver circuit 230. The source start pulse SSP is a clock signal controlling the sampling time of data in each of the SDICs. The source output enable signal SOE controls the output time of the data driver circuit 230.

The display device 200 may further include power management integrated circuit (PMIC) to supply various forms of voltage or current to the display panel 210, the gate driver circuit 220, the data driver circuit 230, and the like, or control various forms of voltage or current to be supplied to the same.

The subpixels SP are defined by intersections of the gate lines GL and the data lines DL. Liquid crystal or light-emitting diodes (LEDs) may be disposed in the subpixels SP, depending on the type of the display device 200.

For example, in a case in which the display device 200 is a liquid crystal display (LCD) device, the display device 200 includes a light source device, such as a backlight unit, to illuminate the display panel 210. In addition, liquid crystal is disposed in the subpixels SP of the display panel 210. It is possible to adjust the orientations of liquid crystal molecules using electric fields generated by the data voltages supplied to the subpixels SP, thereby displaying an image representing brightness levels corresponding to the image data.

Alternatively, the display device 200 may display an image by representing brightness levels corresponding to the image data using a self-emitting device. The display device 200 may include light-emitting devices, such as LEDs or OLEDs, in the subpixels, respectively, and display an image by controlling current flowing through the light-emitting devices, to correspond to data voltages.

The display device 200 as described above may can correct the distortion of an image displayed by the virtual reality/augmented reality device 100 by dividing the area of the display panel 210, in which the image is displayed, into the base area and the distortion correction area.

Figure 6:
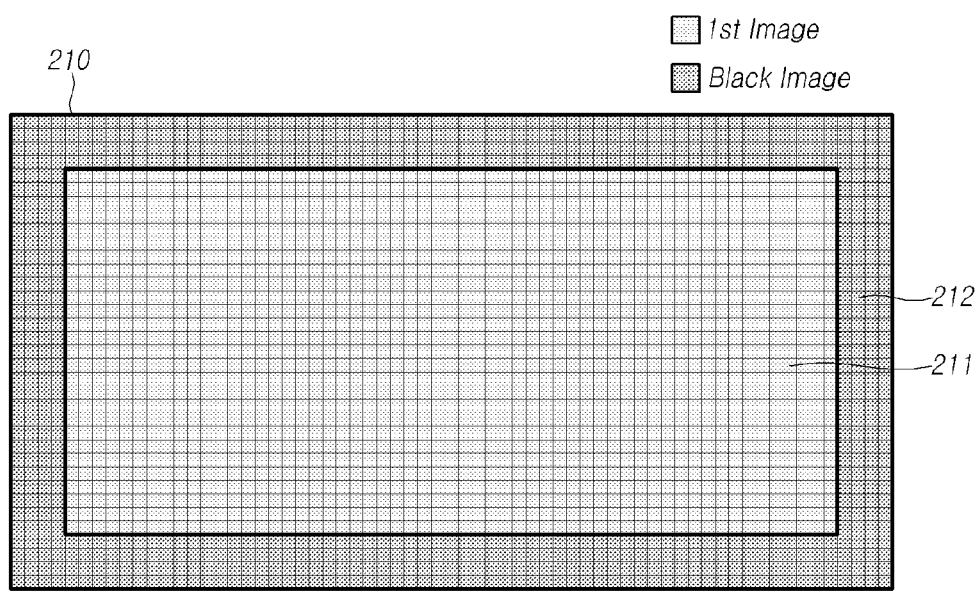
FIG. 6 is a diagram illustrating an active area of the display panel of the display device according to exemplary aspects.

FIG. 6 is a diagram illustrating an active area of the display panel 210 of the display device 200 according to exemplary aspects.

Referring to FIG. 6, the display panel 210 of the display device 200 according to exemplary aspects includes a first active area 211 located in the central portion and a second active area 212 located in peripheral portions.

The first active area 211 may be located in the central portion of the display panel 210, in which N number of subpixels SP may be disposed (where N is a natural number equal to or greater than 2). Here, N may be the same as the number of the subpixels SP required for representing the resolution of the original image in the display device 200.

The first active area 211 may represent an image corresponding to image data that the display device 200 has received from an external source. That is, the first active area 211 may be an area in which the original image is displayed when image distortion correction is not undertaken.

The second active area 212 may be located outside of the first active area 211. M number of subpixels SP may be disposed in the second active area 212 (where M is a natural number equal to or greater than 2). The second active area 212 may be an area on which an image to be displayed during the correction of distortion is displayed.

In addition, the M number of subpixels SP, required for displaying the image for distortion correction, may be disposed in the second active area 212, where M may be smaller than N. The example illustrated in FIG. 6 indicates a case in which four columns or four rows are disposed in the second active area 212 to be used to display the image for distortion correction.

If there is no distortion in the image, the display panel 210 displays the original image (hereinafter, referred to as the "first image") on the first active area 211, and does not display the image on the second active area 212. Here, the second active area 212 may display a blank (or black) image.

That is, if there is no distortion in the image, the first image may be displayed only on the first active area 211, so that the image corresponding to the original image data arrives at the eye of the user.

In contrast, if there is distortion in the image, the image for distortion correction is displayed. In this case, portions of the first image may be displayed on the first active area 211, while the remaining portions of the first image may be displayed on the second active area 212.

In addition, in subpixels SP in the first active area 211, in which the first image is not displayed, a compensation image (hereinafter, referred to as a "second image"), determined based on the first image, may be displayed.

Here, the number of the subpixels SP in the first active area 211 and the second active area 212, displaying the first image, may be the same as N.

In addition, the number of the subpixels SP in the first active area 211, displaying the second image, may be the same as the number of the subpixels SP displaying the first image in the second active area 212.

Accordingly, the first image may have a transformed shape when displayed on the first active area 211 and the second active area 212, so that the image can arrive at the eye of the user without distortion via optical device 300.

In addition, a portion of the first active area 211, in which the first image is not displayed, may display the second image, so that degradation in image quality may not be caused by the transformed shape of the image displayed.

In addition, the number of the subpixels SP displaying the first image on the first active area 211 and the second active area 212 may be maintained constant, so that the resolution of the original image may be maintained even though a transformed image is displayed for distortion correction.

FIG. 7 is a diagram illustrating images displayed by the display panel 210 according to exemplary aspects in order to correct non-linear distortion, in which the images are displayed for the correction of barrel distortion.

Referring to FIG. 7, the display panel 210 according to exemplary aspects may display the first image on the first active area 211 and the second active area 212.

Here, the first image, displayed on the first active area 211 and the second active area 212, may have a shape that the upper and lower portions protrude further outward (i.e. relatively outward portions of the upper and lower portions protrude further than relatively inner portions of the upper and lower portions) and the central portion is relatively concave.

That is, the optical device 300 may transform the first image, displayed on the display panel 210, into a centrally-convex shape while the image is passing through, so that the image having a distortion-corrected shape may arrive at the eye of the user.

Accordingly, a portion of the first image may be displayed on the first active area 211 (see 701), while the remaining portion of the first image may be displayed on the second active area 212 (see 703).

In addition, in the subpixels of the first active area 211, in which the first image is not displayed, the second image may be displayed (see 702). The second image may be determined based on the first image, and be a compensation image able to prevent degradation in image quality that may otherwise be caused by the transformation of the shape of the first image displayed.

In the subpixels of the second active area 212, in which the first image is not displayed, no image may be displayed or a blank (or black) image may be displayed (see 704).

Accordingly, the display device 200 according to exemplary aspects displays a portion of the first image corresponding to the original image, as well as the second image, i.e. a compensation image due to distortion correction, on the first active area 211 of the display panel 210. In addition, the remaining portion of the first image and the blank (or black) image are displayed on the second active area 212 of the display panel 210, due to distortion correction.

As described above, the first image having the transformed shape is displayed on the first active area 211 and the second active area 212, so that the first image may arrive at the eye of the user without distortion via the optical device 300.

In addition, as the first image is displayed on the first active area 211 and the second active area 212, distortion correction may be performed while the resolution of the original image is being maintained.

Here, in the subpixels SP in the first active area 211, in which the first image is not displayed, the second image may be displayed. The position, grayscale, and the like of the second image may be determined in consideration of distortion correction of the first image.

Figure 8:
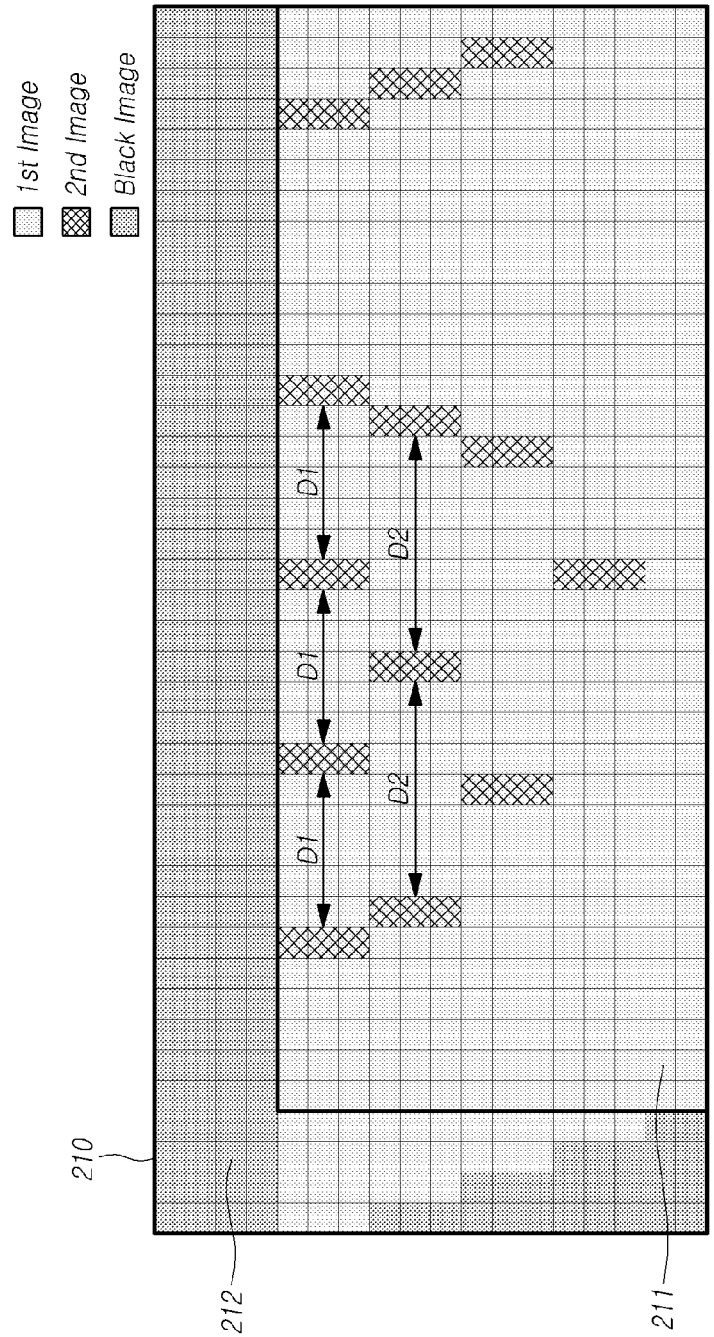
FIGS. 8, 9 and 10 are diagrams illustrating a variety of examples of the non-linear distortion correction image illustrated in FIG. 7.
Figure 9:
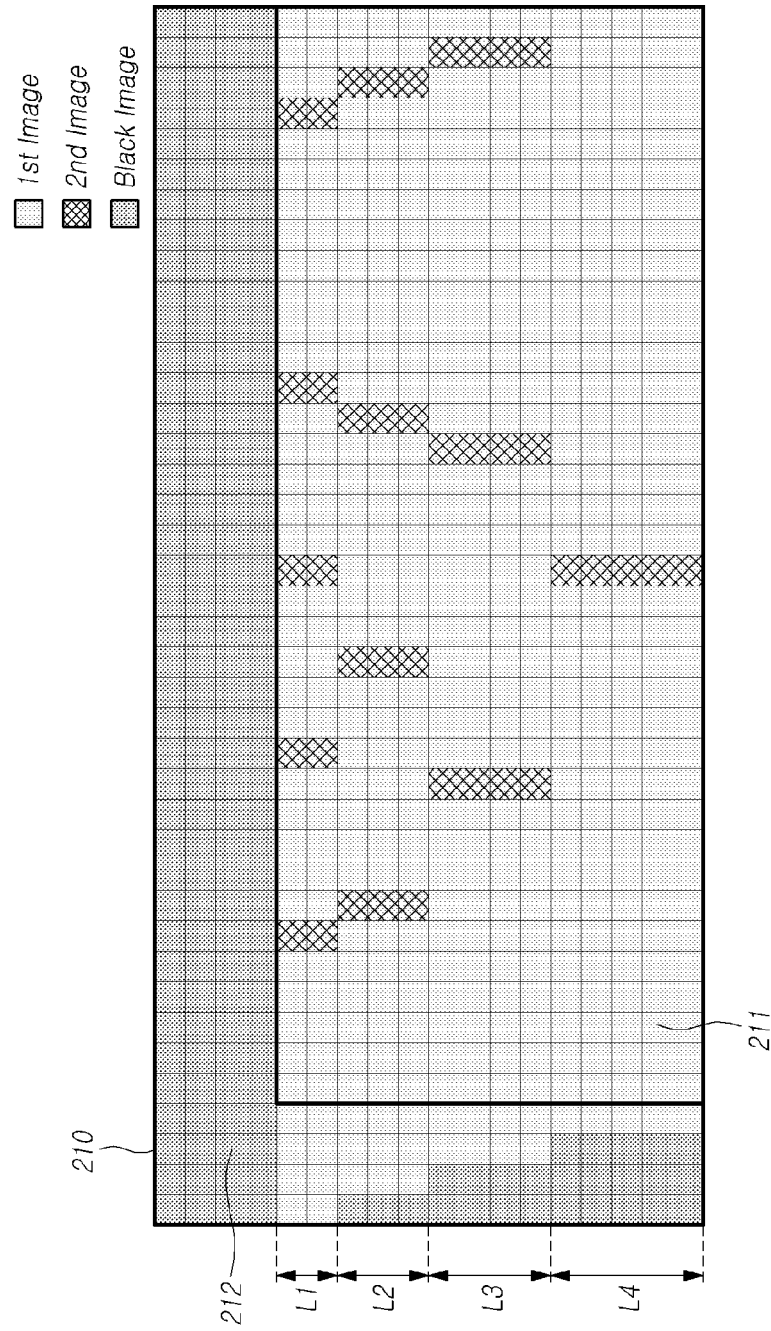
Figure 10:
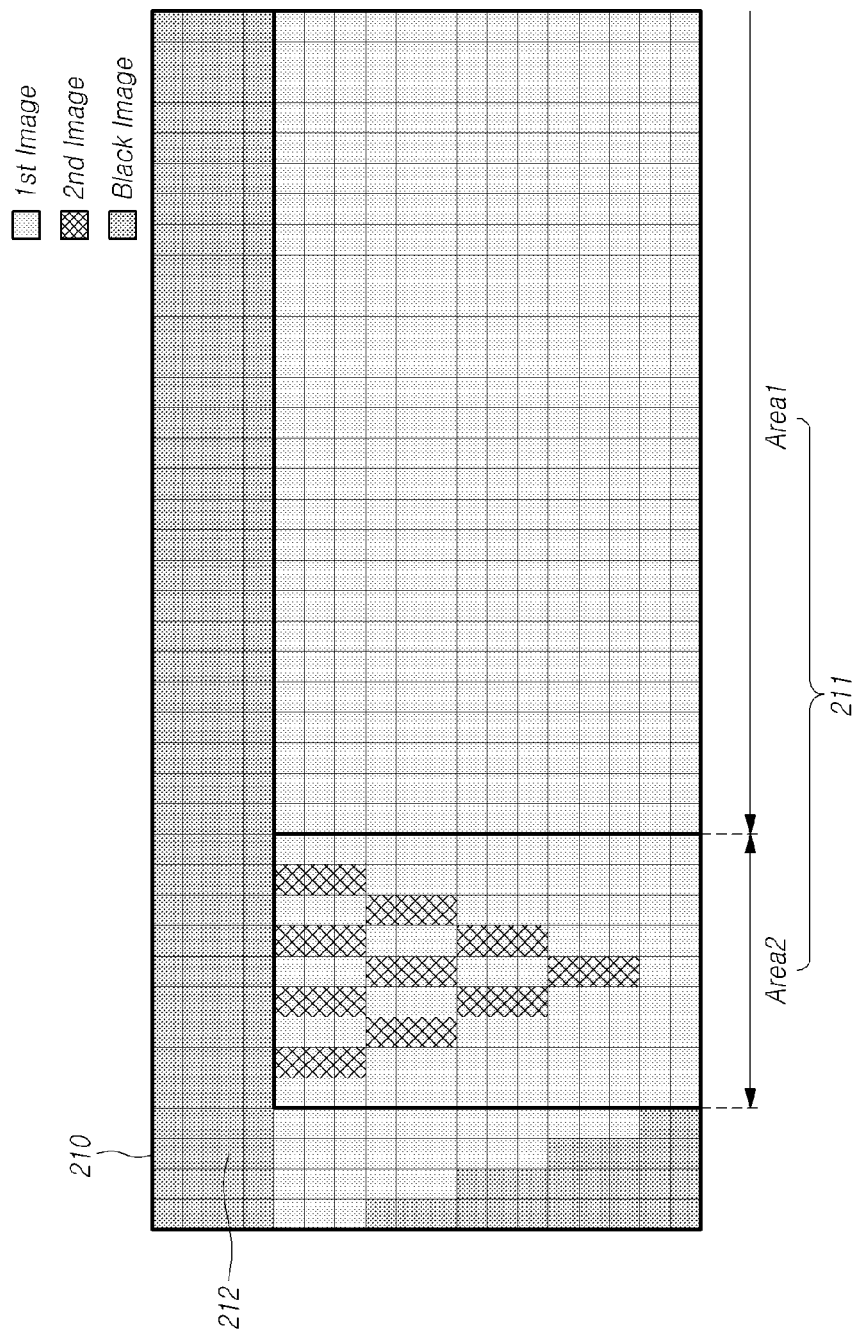

FIGS. 8 to 10 are diagrams illustrating a variety of examples of the second image inserted into the non-linear distortion correction image illustrated in FIG. 7. In particular, FIGS. 8 to 10 illustrate portion A in FIG. 7.

Referring to FIG. 8, the second images may be inserted between the subpixels SP in which the first image is displayed. The subpixels displaying the second images may be located at equal distances in a single direction.

For example, in the second active area 212 located on one side of the first active area 211, the first image may be displayed in four subpixels SP in each of first to third columns. Thus, the second image may be inserted into four subpixels SP in each of first to third columns of the first active area 211.

Here, the subpixels SP in which the second image is displayed may be spaced apart at equal distances D1.

In addition, since the first image is displayed on three subpixels in every column of fourth to sixth columns of the second active area 212, the second image may be inserted into three subpixels SP in each column of fourth to sixth columns of the first active area 211.

The subpixels in which the second image is displayed may be spaced apart from each other at equal distances D2.

That is, the second image may be displayed on some subpixels SP of the first active area 211, depending on the shape transformation of the first image for distortion correction. The subpixels displaying the second image are located at equal distances in a single direction.

Thus, even in a case in which portions of the second image are inserted between portions of the first image, the effect of the inserted second image to the image quality of the first image may be minimized.

In addition, the second image may be displayed such that the portions thereof in different columns are adjacent to each other as illustrated in FIG. 7, although the portions of the second image may be displayed so as to not be adjacent to each other.

In addition, the number of the subpixels SP, in which the portions of the second image are displayed adjacently, may differ, depending on the shape of the first image after distortion correction.

Referring to FIG. 9, the first image is displayed on four subpixels SP in first and second columns of the second active area 212 located on one side of the first active area 211. In addition, the first image is displayed on three subpixels SP in third to fifth columns of the second active area 212, and is displayed on two subpixels SP in sixth to ninth columns of the second active area 212.

Thus, the second image is inserted into four subpixels SP in first and second columns of the first active area 211, into three subpixels SP in third to fifth columns of the first active area 211, and into two subpixels SP in sixth to ninth columns of the first active area 211.

That is, the numbers of the columns, in which the second image is inserted into the same numbers of subpixels SP, may not be constant. That is, the columns may be 2 lines (L1), three lines (L2), four lines (L3), five lines (L4), or the like.

Since the numbers of the columns, in which the second image is inserted into the same numbers of subpixels SP, are non-constant as described above, more accurate distortion correction can be performed by adjusting the second image inserted into the portions significantly and insignificantly deformed by distortion.

The second image may be inserted into the first active area 211 while being distributed across the entire portions of the first active area 211, although the second image may be inserted into some portions of the first active area 211.

Referring to FIG. 10, the first active area 211 may include a first area Area1 and a second area Area2 divided in a single direction.

In addition, among the plurality of subpixels SP, subpixels SP disposed in the first area Area1 of the first active area 211 may only display the first image, while subpixels SP disposed in the second area Area2 of the first active area 211 may display the first image and the second image.

When the first image and the second image are displayed on the first area Area1 and the second area Area2 in a selective manner as described above, portions of the image, not transformed for distortion correction, may be displayed on the first area Area1. In addition, portions of the image, transformed for distortion correction, may be displayed on the second area Area2 and the second active area 212 located on one side of the second area Area2.

Such distortion correction may lead to accurate distortion correction in a case in which only a portion of the image is distorted, as in the transformation of the end portion of the reflector 320 of the optical device 300.

That is, the locations of the second image inserted into the first active area 211 may be adjusted to more accurately perform the correction of partial distortion.

In addition, the second image, inserted between the first image for distortion correction, may be an image determined based on the first image adjacent thereto.

Figure 11:
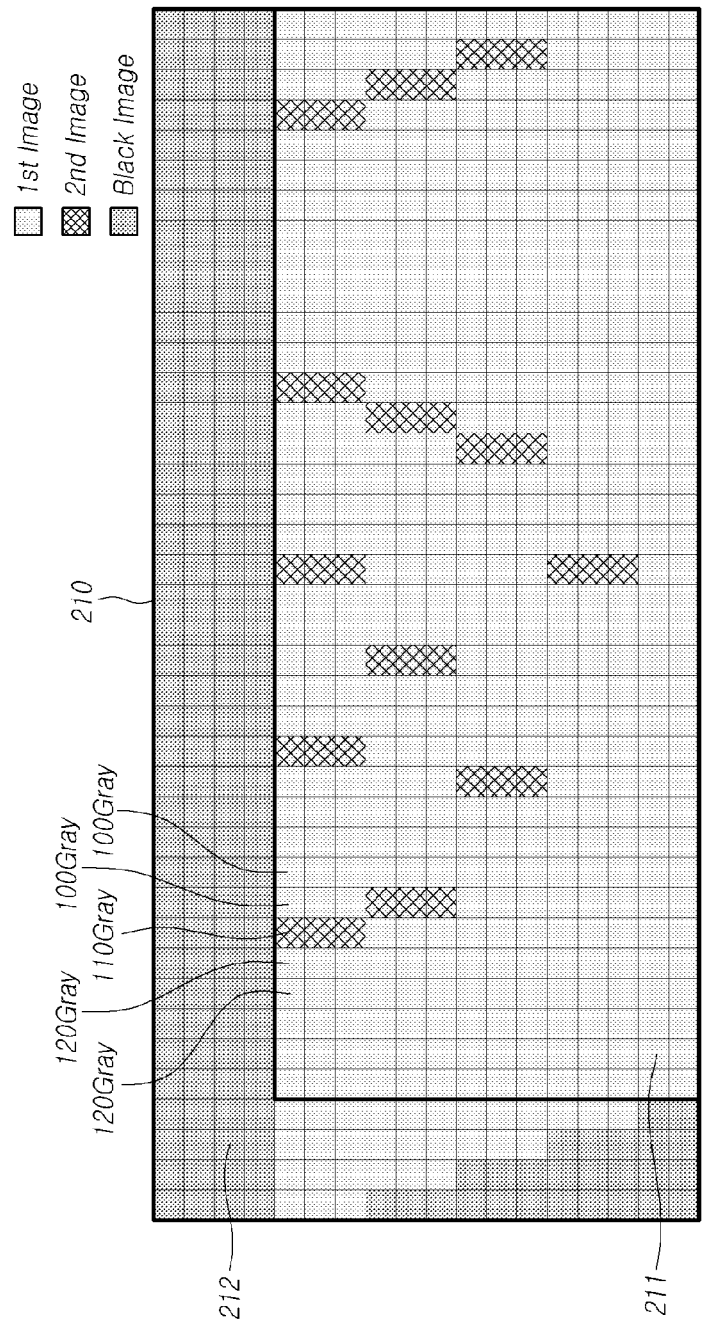
FIGS. 11 and 12 are diagrams illustrating grayscales of the image inserted for correction of non-linear distortion, illustrated in FIG. 7.
Figure 12:
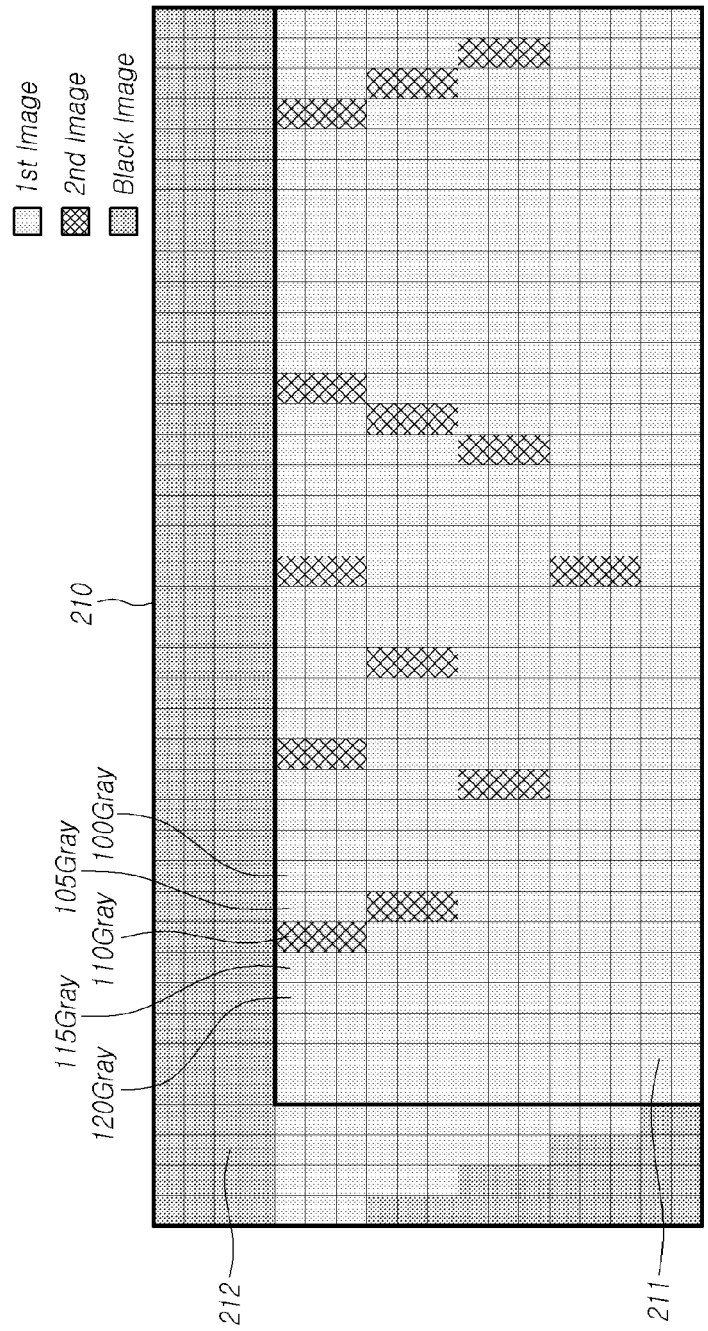

FIGS. 11 and 12 are diagrams illustrating grayscales of the second image inserted for correction of non-linear distortion, illustrated in FIG. 7.

Referring to FIG. 11, the second image, inserted between portions of the first image in the first active area 211, may be determined based on the grayscales of the portions of the first image adjacent thereto.

For example, the grayscale of the second image may be the same as the grayscale of one of the portions of the first image adjacent to the second image.

Alternatively, the grayscale of the second image may be a grayscale included in a range of grayscales of the portions of the first image adjacent the second image. Here, the grayscale of the second image may be a grayscale corresponding to an intermediate value of the grayscales of two portions of the first image adjacent to the second image.

As illustrated in FIG. 11, in a case in which the grayscales of the portions of the first image, appearing in subpixels SP adjacent to subpixels displaying the second image, are 100 Gray and 120 Gray, the grayscale of the second image may be 110 Gray.

As described above, the grayscale of the second image, inserted between the portions of the first image for distortion correction, may be determined based on the grayscales of the portions of the first image adjacent to the second image, so that the effect of the insertion of the second image to the image quality can be minimized.

In addition, in the determination of the grayscale of the second image, the grayscales of the portions of the first image adjacent to the second image may be adjusted.

Referring to FIG. 12, the grayscale of the second image, inserted between the portions of the first image, may be determined to be 110 Gray, based on the grayscales of the portions of the first image adjacent to the second image.

Here, the grayscales of the portions of the first image displayed adjacent to the second image may be Gray and Gray, respectively.

That is, in a case in which two subpixels SP located adjacently to the left of subpixels SP displaying the second image display the first image at 120 Gray and two subpixels SP located adjacently to the right of the subpixels SP displaying the second image display the first image at 100 Gray, the second image may be set to be non-prominent from the entire image by adjusting the grayscales of portions of the first image directly adjacent to the second image.

The insertion of the second image and the determination of the grayscales as described above may be performed by the controller 240 of the display device 200.

Figure 13:
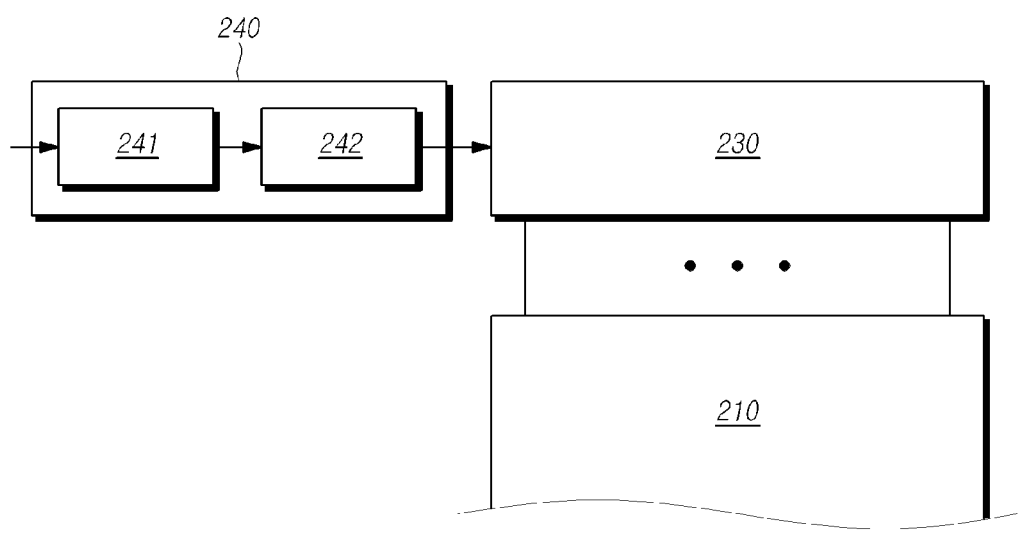
FIG. 13 is a block diagram illustrating a configuration of the controller controlling the grayscales of the image inserted for correction of non-linear distortion, illustrated in FIGS. 11 and 12.

FIG. 13 is a block diagram illustrating a configuration of the controller 240 controlling the grayscales of the second image inserted for correction of non-linear distortion, illustrated in FIGS. 11 and 12.

Referring to FIG. 13, the controller 240 according to exemplary aspects may be a processor that may further include a compensation image processor 241 and a digital filtering processor 242.

The compensation image processor 241 determines the number and positions of subpixels SP displaying the first image in the first active area 211 and the second active area 212 in order to correct distortion.

In addition, the number and positions of subpixels SP, of the first active area 211, into which the second image is to be inserted, are specified, and the grayscales of the second image to be inserted are determined.

The grayscales of the second image may be the same as the grayscales of portions of the first image adjacent to the second image, or may be determined by grayscales included in a range of grayscales of the portions of the first image adjacent to the second image.

If the grayscales of the second image are determined by the compensation image processor 241, the digital filtering processor 242 may perform digital filtering on the second image and the portions of the first image adjacent to the second image.

For example, the digital filtering processor 242 may perform the digital filtering on the portions of the first image adjacent to the second image, in consideration of the grayscales of the second image and the surroundings, so that the grayscales of the portions of the first image gradually increase or decrease from the grayscales of the second image.

As described above, the grayscales of the second image may be determined, based on the grayscales of the first image adjacent to the second image, and the digital filtering may be performed on the grayscales of the portions of the first image adjacent to the second image, so that the image quality of the corresponding area can be prevented from being degraded even if the second image is inserted.

The above-described image processing may be performed by the controller 240 of the display device 200. In some cases, the image processing may be performed by an external device (e.g. a host system) transferring image data to the controller 240.

The display device 200 according to exemplary aspects may display the image, corrected by considering distortion caused by the optical device 300, thereby preventing the distortion of the image arriving at the eye of the user via the virtual reality/augmented reality device 100.

Such distortion correction may be performed to non-linear distortion or linear distortion. In addition, in a case in which both non-linear distortion and linear distortion occur, the corrected image may be displayed so that the image can arrive at the eye of the user without distortion.

Figure 14:
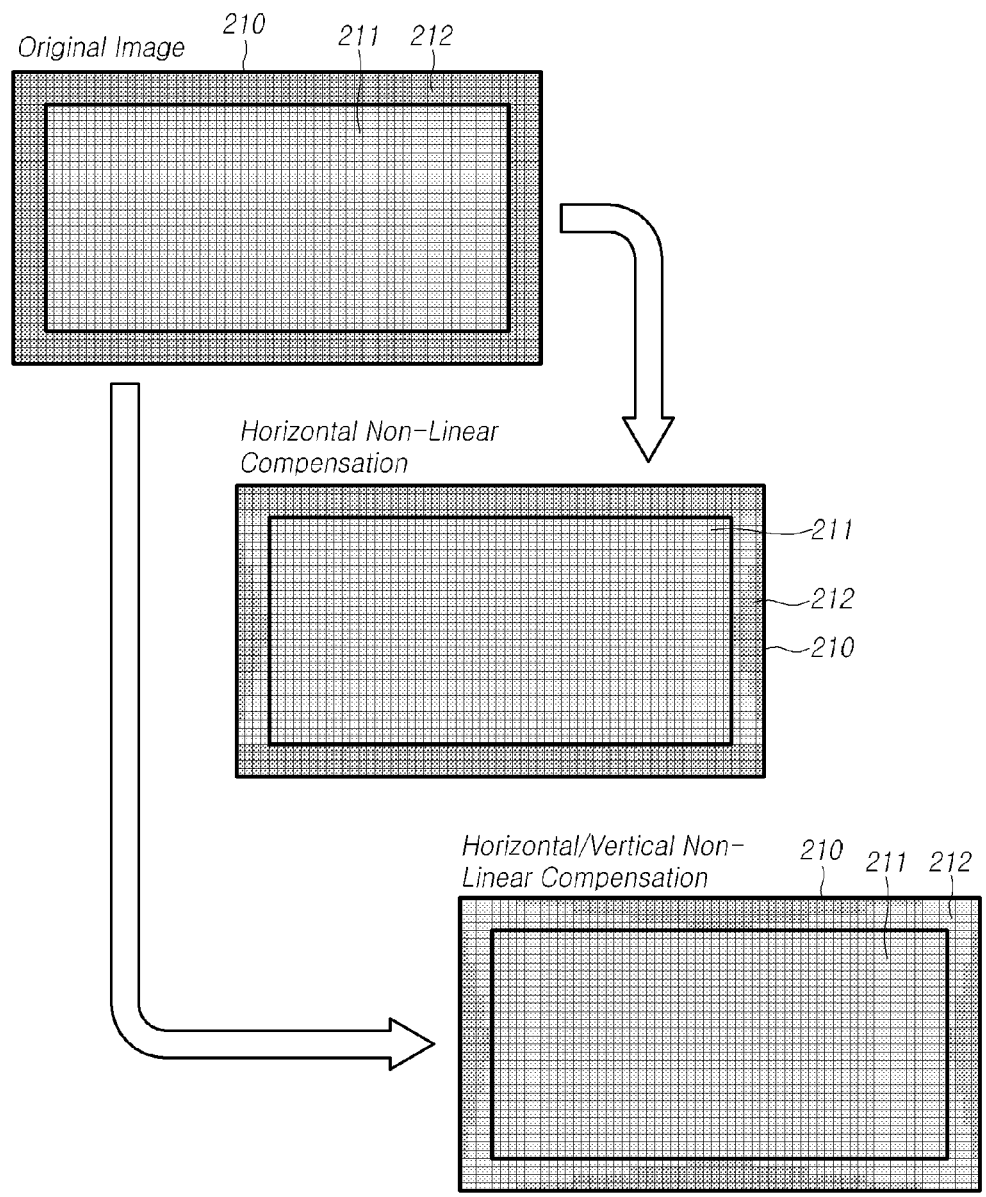
FIG. 14 is a diagram illustrating final images displayed by the display panel according to exemplary aspects in order to correct non-linear distortion.

FIG. 14 is a diagram illustrating final images displayed by the display panel 210 according to exemplary aspects in order to correct non-linear distortion.

Referring to FIG. 14, an original image may be displayed on the first active area 211 of the display panel 210. That is, the original image may be displayed on N number of pixels SP disposed in the first active area 211.

If distortion correction is performed to the original image, the display panel 210 displays an image on the first active area 211 and the second active area 212.

That is, the image may be displayed on N or more number of subpixels SP, in which portions of the image displayed may be a first image, while the remaining portions of the image displayed may be a second image inserted for distortion correction. Here, the number of subpixels SP displaying the first image may be the same as N, i.e. the number of the subpixels SP displaying the original image.

If correction of non-linear distortion is performed in a horizontal direction, the first image is displayed on portions of the second active area 212 located to the right and left of the first active area 211.

Alternatively, if correction of non-linear distortion is performed in a vertical direction, the first image is displayed on portions of the second active area 212 located above and below the first active area 211.

In addition, the first image may be displayed on portions of the second active area 212 located around the first active area 211, i.e. above and below and to the right and left of the first active area 211.

In addition, some pixels SP of the first active area 211 display the second image, i.e. a compensation image due to distortion correction.

As described above, the distortion-corrected first image may be displayed on the first active area 211 and the second active area 212 of the display panel 210, and compensation may be performed by the insertion of the second image, so that the original image can arrive at the eye of the user without distortion.

The above-described distortion correction may be performed not only to non-linear distortion, but also to linear distortion.

Figure 15:
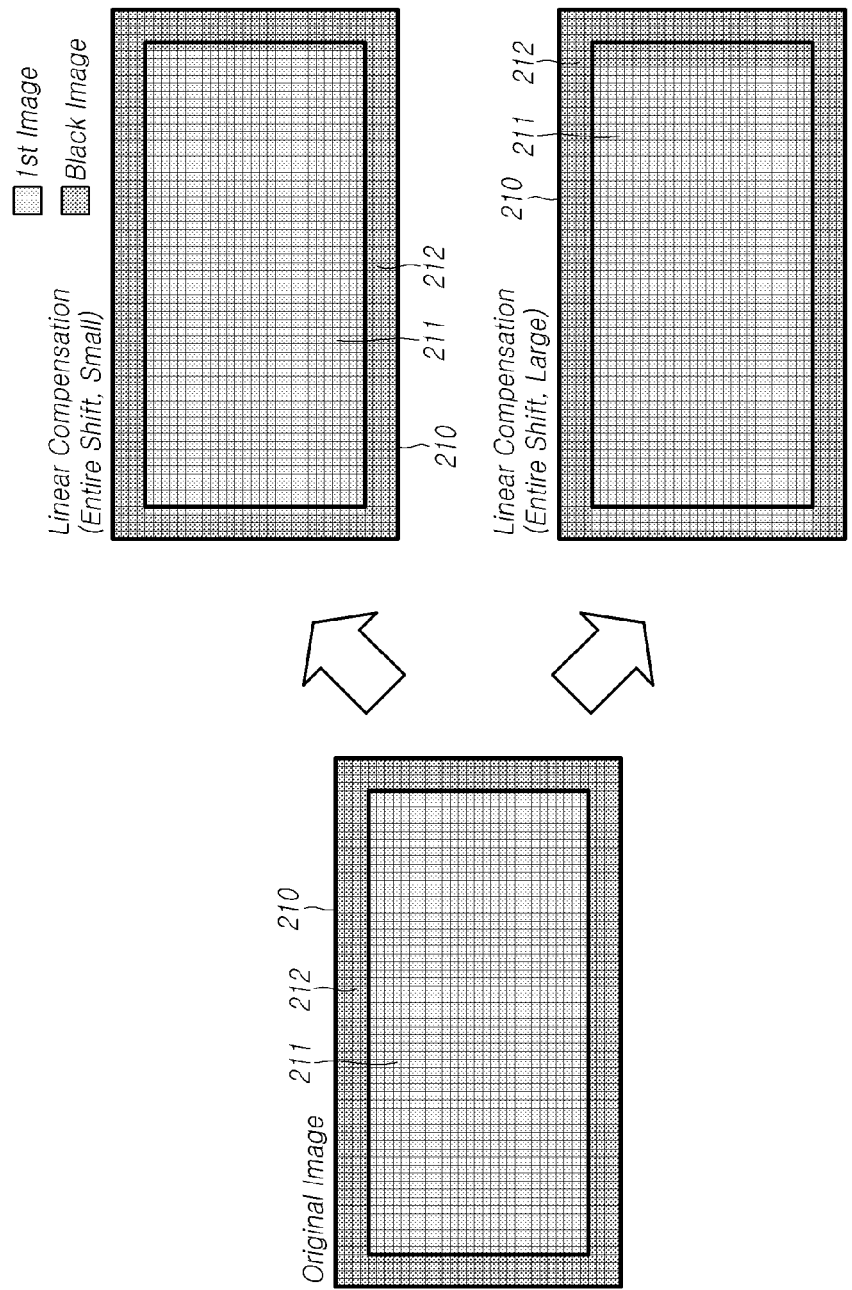
FIGS. 15 and 16 are diagrams illustrating final images displayed by the display panel 210 according to exemplary aspects in order to correct non-linear distortion.
Figure 16:
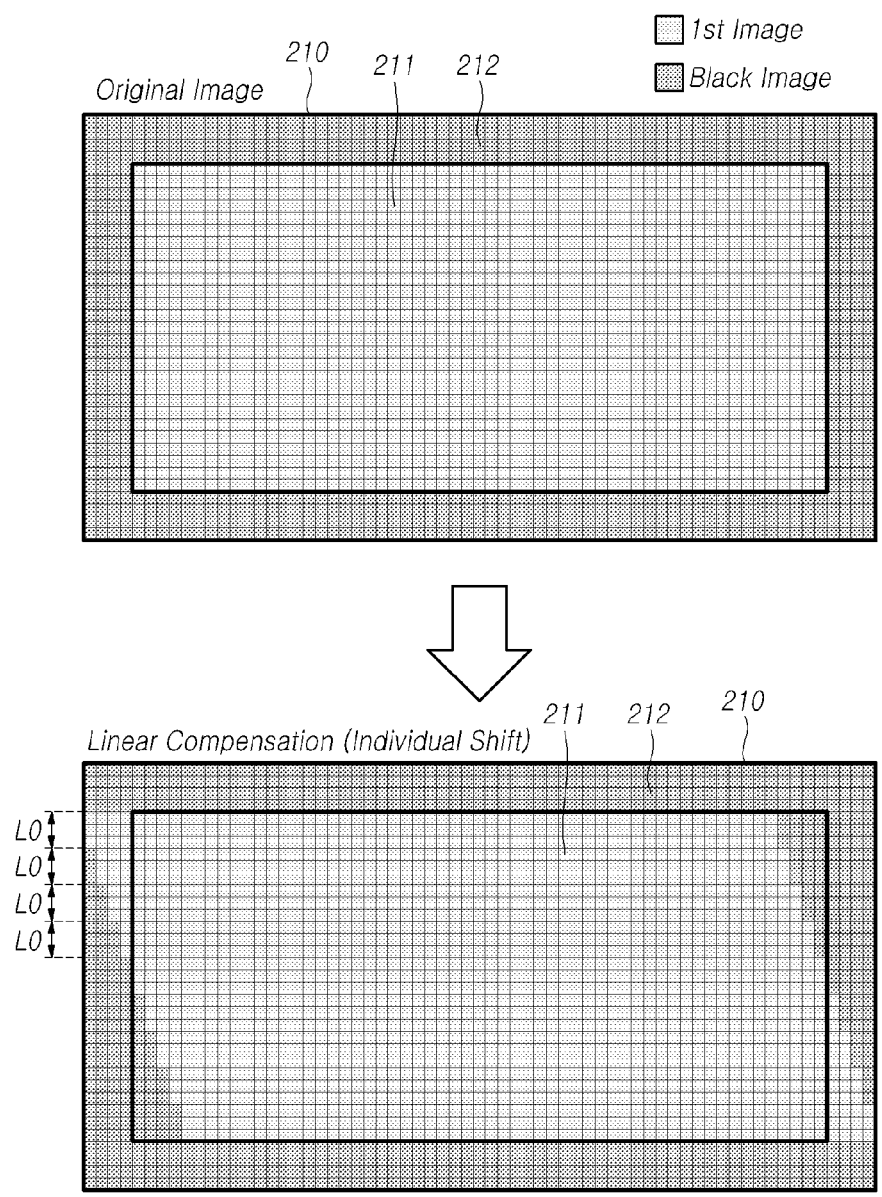

FIGS. 15 and 16 are diagrams illustrating final images displayed by the display panel 210 according to exemplary aspects in order to correct non-linear distortion.

Referring to FIG. 15, when an original image, shifted in one direction, arrives at the eye of the user, a first image displayed on the display panel 210 may be shifted in the opposite direction, so that the distortion can be corrected.

For example, if the entirety of the image arriving at the eye of the user is shifted in one direction, the entirety of the first image displayed on the display panel 210 may be shifted.

Then, the first image is displayed on portions of the first active area 211, and a blank (or black) image is displayed on the remaining portions of the first active area 211.

In addition, the first image is displayed on portions of the second active area 212, and the blank (or black) image is displayed on the remaining portions of the second active area 212.

That is, since a second image may not be inserted in the case of correction of linear distortion, the blank (or black) image may be displayed on the remaining portions of the first active area 211.

Although such correction of linear distortion may be performed to the entirety of corresponding areas, the correction of linear distortion may be performed according to columns or rows of subpixels SP or individually.

Referring to FIG. 16, the display panel 210 may display the first image in a shifted shape in order to correct linear distortion.

Here, the first image may be shifted in different directions and by different levels, according to the column of the subpixels SP.

In addition, in some columns of adjacent subpixels SP, the first image may be shifted in the same direction and by the same level.

Here, the subpixels SP shifted in the same direction and by the same level may be located at equal distances, as indicated by L0.

That is, in the case of correction of linear distortion, if the image is shifted in irregular directions, the first image may be shifted individually according to each column or row of the subpixels SP, so that the distortion can be corrected.

In addition, if non-linear distortion is not concurrent, the number of columns or rows of subpixels SP, shifted in the same direction and by the same level, may be set to be constant, so that linear distortion can be accurately corrected.

As described above, in the virtual reality/augmented reality device 100, the display device 200 according to exemplary aspects can insert a compensation image into the display panel 210 or shift a display image, so that an image, the non-linear or linear distortion of which is corrected, can arrive at the eye of the user.

In addition, even in a case in which both non-linear distortion and linear distortion occur concurrently, both the insertion of a compensation image and the shift of a display image can be performed simultaneously, so that an image, the distortion of which is corrected, can arrive at the eye of the user.

Figure 17:
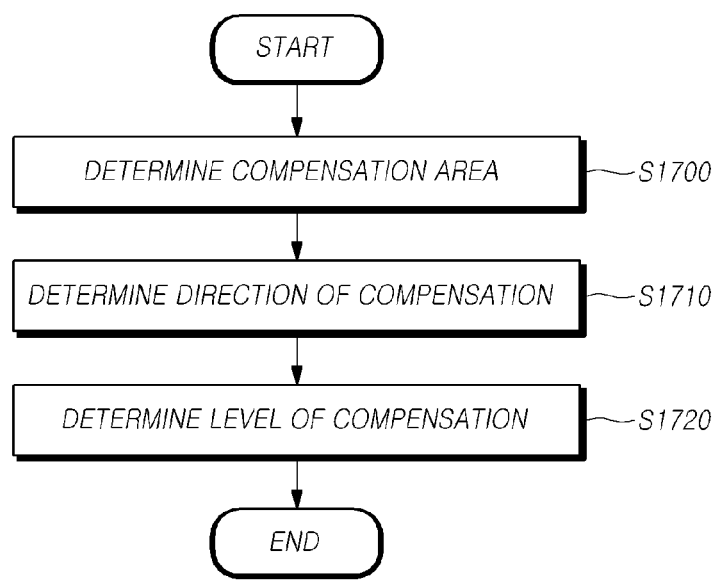
FIGS. 17 and 18 are flowcharts illustrating processes in which the display device according to exemplary aspects corrects distortion of an image.
Figure 18:
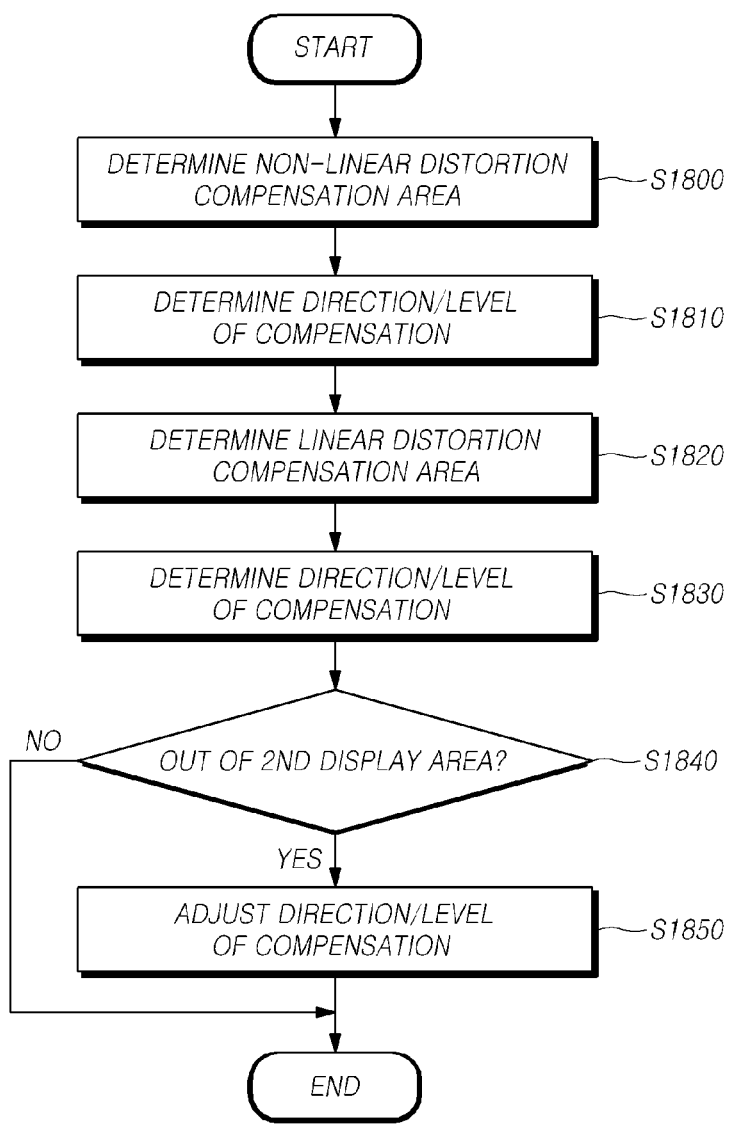

FIGS. 17 and 18 are flowcharts illustrating processes in which the display device 200 according to exemplary aspects corrects distortion of an image.

Referring to FIG. 17, in S1700, if an image is distorted, the display device 200 according to exemplary aspects determines a compensation area in which the image is distorted.

In S1710, the display device 200 according to exemplary aspects determines the direction of compensation, depending on the type of distortion of the image.

In an example, in the case of correction of non-linear distortion, if the non-linear distortion is barrel distortion, the image is determined to be corrected so that the upper and lower ends thereof are expanded, and if the non-linear distortion is pincushion distortion, the image is determined to be corrected so that the central portion thereof is expanded.

In another example, in the case of correction of linear distortion (shift distortion), the image may be determined to be shifted in a direction opposite to the direction in which the image is distorted by the shift.

If the direction of compensation is determined, the display device 200 determines the level of compensation, depending on the level of distortion of the image, in S1720.

That is, a compensation image to be inserted may be determined in the case of correction of non-linear distortion, while the level of shift of the image may be determined in the case of correction of linear distortion.

The non-linear distortion and the linear distortion may be corrected separately, although the non-linear distortion and the linear distortion may be corrected simultaneously, depending on the type of distortion of the image.

Referring to FIG. 18, the display device 200 according to exemplary aspects determines a non-linear distortion compensation area in S1800, and determines the direction and level of compensation for non-linear distortion in S1810.

In addition, the display device 200 determines a linear distortion compensation area in S1820, and determines the direction and level of compensation for linear distortion in S1830.

Herein, the compensation for linear distortion is described as being subsequent to the compensation for non-linear distortion by way of example, although the compensation for linear distortion may be performed before the compensation for non-linear distortion.

If the direction and level of the compensation for non-linear distortion and the direction and level of the compensation for linear distortion are determined, the display device 200 determines whether or not the image, displayed based on the determined compensation, extends out of the second active area 212 in S1840.

That is, when the compensation for non-linear distortion and the compensation for linear distortion are performed simultaneously, the image, corrected by the compensation, may extend out of the second active area 212.

Accordingly, the display device 200 may check the resultant image after the compensation for distortion is determined, and if the corrected image extends out of the second active area 212, output the image by adjusting the direction and level of compensation of the image in S1850.

In the virtual reality/augmented reality device 100, the display device 200 according to exemplary aspects may display a first image, distortion of which is corrected through the first active area 211 and the second active area 212 of the display panel 210, so that the image can arrive at the eye of the user without distortion via the optical device 300.

In addition, along with correction of the distorted first image, a second image may be inserted as a compensation image, so that degradation of the image quality of the first image, recognized by the user, can be prevented.

Furthermore, since the second active area 212, located outside of the first active area 211, may be used in the distortion correction, it is possible to correct the distorted image while maintaining the resolution of the original image.

The foregoing descriptions and the accompanying drawings have been presented in order to explain certain principles of the present disclosure by way of example. A person having ordinary skill in the art to which the present disclosure relates could make various modifications and variations without departing from the principle of the present disclosure. The foregoing aspects disclosed herein shall be interpreted as being illustrative, while not being limitative, of the principle and scope of the present disclosure. It should be understood that the scope of the present disclosure shall be defined by the appended Claims and all of their equivalents fall within the scope of the present disclosure.

What is claimed is:

1. A virtual reality/augmented reality device comprising:
a display device displaying an image and a blank image; and
an optical device transferring the images displayed by the display device, wherein the display device includes:
a display panel in which a plurality of gate lines, a plurality of data lines, and a plurality of subpixels are disposed;
a gate driver circuit driving the plurality of gate lines;
a data driver circuit driving the plurality of data lines; and
a controller controlling the gate driver circuit and the data driver circuit,
wherein the display panel includes a first active area in which N number of subpixels among the plurality of subpixels are disposed, and a second active area in which M number of subpixels among the plurality of subpixels are disposed and is located outside of the first active area, where the N is a natural number equal to or greater than 2 and the M is a natural number equal to or greater than 2,
wherein the image is displayed on the N number of subpixels or more subpixels among the plurality of subpixels in the first active area and the second active area, and the blank image is displayed on subpixels among the plurality of subpixels except for the subpixels displaying the expressive image,
wherein the display panel displays a first image and a second image on at least part of N subpixels disposed in the first active area and displays the first image and the blank (or black) image on at least part of M subpixels disposed in the second active area,
wherein the first image corresponds to image data received by the controller from an external source, and the second image is determined based on the first image,
wherein at least one subpixel of the subpixels displaying the second image in the first active area is located between the subpixels displaying the first image in the first active area,
wherein the controller controls grayscales of the second image inserted according to correction of non-linear distortion and includes a compensation image processor and a digital filtering processor,
wherein the compensation image processor determines a number and positions of subpixels displaying the first image in the first and second active areas to correct the non-linear distortion, and
wherein the digital filtering processor performs digital filtering on the second image and portions of the first image adjacent to the second image when the grayscales of the second image are determined by the compensation image processor.

2. The virtual reality/augmented reality device according to claim 1, wherein a total number of the subpixels displaying the first image in the first active area and the subpixels displaying the first image in the second active area is N.

3. The virtual reality/augmented reality device according to claim 1, wherein the number of the subpixels displaying the second image in the first active area is equal to the number of the subpixels displaying first image in the second active area.

4. The virtual reality/augmented reality device according to claim 1, wherein a grayscale of the second image is equal to one grayscale of grayscales of the first image displayed by two or more subpixels displaying the first image in the first active area, adjacent to the at least one subpixel of the subpixels displaying the second image, or is included in a range of the grayscales of the first image.

5. The virtual reality/augmented reality device according to claim 1, wherein at least part of the subpixels displaying the second image in the first active area is spaced apart at an equal distance in a single direction.

6. The virtual reality/augmented reality device according to claim 1, wherein the first active area is divided into a first area and a second area in a single direction, all of subpixels disposed in the first area, among the subpixels disposed in the first active area, display the first image, and part of subpixels disposed in the second area, among the subpixels disposed in the first active area, display the first image, and remainder of the subpixels disposed in the second area displays the second image.

7. The virtual reality/augmented reality device according to claim 1, wherein the display panel displays the first image and the blank image on at least part of the subpixels disposed in the first active area, and displays the first image and the blank image on at least part of the subpixels disposed in the second active area.

8. The virtual reality/augmented reality device according to claim 1, wherein the display panel displays the first image, the second image, and the blank image on at least part of the subpixels disposed in the first active area, and displays the first image and the blank image on at least part of the subpixels disposed in the second active area.

9. A display device comprising:
a display panel in which a plurality of gate lines, a plurality of data lines, and a plurality of subpixels are disposed;
a gate driver circuit driving the plurality of gate lines;
a data driver circuit driving the plurality of data lines; and
a controller controlling the gate driver circuit and the data driver circuit,
wherein the display panel comprises a first active area in which N number of subpixels among the plurality of subpixels are disposed, and a second active area in which M number of subpixels among the plurality of subpixels are disposed and is located outside of the first active area, where the N is a natural number equal to or greater than 2, and the M is a natural number equal to or greater than 2,
wherein a first image and a second image are displayed on at least part of the subpixels disposed in the first active area, and the first image and a blank image are displayed on at least part of the subpixels disposed in the second active area,
wherein the first image corresponds to image data received by the controller from an external source, and the second image is determined based on the first image,
wherein at least one subpixel of the subpixels displaying the second image in the first active area is located between the subpixels displaying the first image in the first active area,
wherein the controller controls grayscales of the second image inserted according to correction of non-linear distortion and includes a compensation image processor and a digital filtering processor,
wherein the compensation image processor determines a number and positions of subpixels displaying the first image in the first and second active areas to correct the non-linear distortion, and
wherein the digital filtering processor performs digital filtering on the second image and portions of the first image adjacent to the second image when the grayscales of the second image are determined by the compensation image processor.

10. The display device according to claim 9, wherein a total number of the subpixels displaying the first image in the first active area and the subpixels displaying the first image in the second active area is N.

11. The display device according to claim 9, wherein the number of the subpixels displaying the second image in the first active area is equal to the number of the subpixels displaying the first image in the second active area.

12. A display panel comprising:
a first active area in which N number of subpixels are disposed; and
a second active area in which M number of subpixels are disposed and the second active area located outside of the first active area, where the N is a natural number equal to or greater than 2, and the M is a natural number equal to or greater than 2,
wherein a first image and a second image are displayed on at least part of the subpixels disposed in the first active area, and the first image and a blank image are displayed on at least part of the subpixels disposed in the second active area, wherein the first image corresponds to image data received by a controller from an external source, and the second image is determined based on the first image, wherein at least one subpixel of the subpixels displaying the second image in the first active area is located between the subpixels displaying the first image in the first active area, wherein the controller controls grayscales of the second image inserted according to correction of non-linear distortion and includes a compensation image processor and a digital filtering processor, wherein the compensation image processor determines a number and positions of subpixels displaying the first image in the first and second active areas to correct the non-linear distortion, and wherein the digital filtering processor performs digital filtering on the second image and portions of the first image adjacent to the second image when the grayscales of the second image are determined by the compensation image processor.

13. The display panel according to claim 12, wherein a total number of the subpixels displaying the first image in the first active area and the subpixels displaying the first image in the second active area is N.

14. The display panel according to claim 12, wherein the number of the subpixels displaying the second image in the first active area is equal to the number of the subpixels displaying the first image in the second active area.

15. The display panel according to claim 12, wherein grayscales of the second image is determined based on grayscales of the first image adjacent to the second image.

16. The display panel according to claim 12, wherein the blank image is displayed on the subpixels of the second active area when the first image is not displayed on the subpixels of the second active area.

* * * * *